United States Patent
Li et al.

(10) Patent No.: US 11,721,335 B2
(45) Date of Patent: Aug. 8, 2023

(54) HIERARCHICAL SELF-ATTENTION FOR MACHINE COMPREHENSION

(71) Applicant: KONINKLIJKE PHILIPS N.V., Eindhoven (NL)

(72) Inventors: Tao Li, Cambridge, MA (US); Sheikh Sadid Al Hasan, Cambridge, MA (US); Vivek Varma Datla, Cambridge, MA (US); Oladimeji Feyisetan Farri, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 325 days.

(21) Appl. No.: 16/916,697

(22) Filed: Jun. 30, 2020

(65) Prior Publication Data

US 2021/0005195 A1    Jan. 7, 2021

Related U.S. Application Data

(60) Provisional application No. 62/869,075, filed on Jul. 1, 2019.

(51) Int. Cl.
| | | |
|---|---|---|
| *G10L 15/00* | (2013.01) | |
| *G10L 15/22* | (2006.01) | |
| *G10L 15/18* | (2013.01) | |
| *G06F 40/216* | (2020.01) | |
| *G06N 3/02* | (2006.01) | |
| *G06F 17/16* | (2006.01) | |
| *G06F 3/16* | (2006.01) | |

(52) U.S. Cl.
CPC .............. *G10L 15/22* (2013.01); *G06F 3/167* (2013.01); *G06F 17/16* (2013.01); *G06F 40/216* (2020.01); *G06N 3/02* (2013.01); *G10L 15/18* (2013.01)

(58) Field of Classification Search
CPC .... G06F 16/144; G06F 16/148; G06F 16/156; G10L 15/00
See application file for complete search history.

(56) References Cited

U.S. PATENT DOCUMENTS

| | | | |
|---|---|---|---|
| 11,423,066 B2* | 8/2022 | Ganu | G06F 16/3329 |
| 2017/0337479 A1 | 11/2017 | Bachman et al. | |
| 2018/0341871 A1* | 11/2018 | Maitra | G06N 3/0427 |
| 2019/0197154 A1* | 6/2019 | Cohen | G06F 16/248 |

(Continued)

OTHER PUBLICATIONS

Seo, M. et al., "Bi-Directional Attention Flow for Machine Comprehension". Published as a conference paper at ICLR, 2017. arXiv:1611.01603v6.

(Continued)

*Primary Examiner* — Daniel Abebe

(57) ABSTRACT

A method for determining the answer to a query in a document, including: encoding, by an encoder, the query and the document; generating a query-aware context encodings G by a bidirectional attention system using the encoded query and the encoded document; performing a hierarchical self-attention on the query aware document by a hierarchical self-attention system by applying a word to word attention and a word to sentence attention mechanism resulting in a matrix M; and determining the starting word and the ending word of the answer in the document by a span detector based upon the matrix M.

20 Claims, 2 Drawing Sheets

(56) References Cited

U.S. PATENT DOCUMENTS

2021/0232948 A1* 7/2021 Otsuka ................ G06N 3/0454

OTHER PUBLICATIONS

Gong, Y. et al., "Ruminating Reader: Reasoning with Gated Multi-Hop Attention". (2017). arXiv:1704.07415v1.
Indurthi, S. et al., "Cut to the Chase: A Context Zoom-in Network for Reading Comprehension". Proceedings of the 2018 Conference on Empirical Methods in Natural Language Processing. (2018) Brussels, pp. 570-575. 10.18653/v1/D18-1054.
Peters et al., "Deep Contextualized Word Representations". (2018) arXiv:1802.05365v2.

* cited by examiner

HIERARCHICAL SELF-ATTENTION FOR MACHINE COMPREHENSION

TECHNICAL FIELD

Various exemplary embodiments disclosed herein relate generally to hierarchical self-attention for machine comprehension.

BACKGROUND

Machine comprehension (MC) is one of the most important tasks in natural language processing (NLP), where a system has to provide an answer to a query based on the underlying context (e.g., a paragraph or a document). The query refers to a question posed over the information expressed in the paragraph or a document, and the answer refers to a piece of text present in the document. This is a challenging task as it requires the machine to understand and reason in natural language. As such, MC can be considered as one of the building blocks of various real-world applications such as search engines, customer support, question answering, recommendations, summarization, chatbots, etc.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for determining the answer to a query in a document, including: encoding, by an encoder, the query and the document; generating a query-aware context encodings G by a bidirectional attention system using the encoded query and the encoded document; performing a hierarchical self-attention on the query aware document by a hierarchical self-attention system by applying a word to word attention and a word to sentence attention mechanism resulting in a matrix M; and determining the starting word and the ending word of the answer in the document by a span detector based upon the matrix M.

Various embodiments are described, wherein performing a hierarchical self-attention on the query aware document further includes: applying a bidirectional recurrent neural network (BiRNN) on the query-aware context encoding G to produce a matrix G'; extracting sentence-level encodings S' from G'; producing a word-word self-attention matrix $A\_w$ by comparing each word in G' with each other word in G'; and producing a word-sentence self-attention matrix $A\_s$ by comparing each word in G' to each sentence in the extracted sentence-level encodings S', wherein the matrix M is based upon $A\_w$ and $A\_s$.

Various embodiments are described, wherein producing a word-word self-attention matrix $A\_w$ further includes using a trilinear function to compute similarity scores for each word-word comparison and normalizing the resulting matrix row-wise using a softmax function.

Various embodiments are described, wherein producing a word-word self-attention matrix $A\_w$ further includes performing a row-wise maxpool function on the resulting matrix.

Various embodiments are described, wherein producing a word-sentence self-attention matrix $A\_s$ further includes using a trilinear function to compute similarity scores for word-sentence attention and normalizing the resulting matrix row-wise using a softmax function.

Various embodiments are described, wherein producing a word-word self-attention matrix $A\_s$ further includes performing a row-wise maxpool function on the resulting matrix.

Various embodiments are described, wherein performing a hierarchical self-attention on the query aware document further includes merging sentence features from a pretrained source with the extracted sentence-level encodings S'.

Various embodiments are described, wherein the query and the document further i:
 encoding the query and the document with a context dependent encoding;
 encoding the query and the document into word includes vectors via character encoding from a convolution network;
 encoding the query and the document into a word embedding using a context independent word vector library; and
 applying a BiRNN on the context dependent encoded query and document, the word vectors for the query and document, and the word embeddings for the query and document.

Various embodiments are described, wherein the output of the BiRNN for the query is combined with the context dependent encoded query and the output of the BiRNN for the document is combined with the context dependent encoded document.

Various embodiments are described, wherein generating a query-aware context encodings further includes: applying a trilinear function on encoded query and the encoded document to produce a first awareness matrix; applying a row-wise softmax function on the awareness matrix to produce a second awareness matrix; and applying a row-wise maxpool function followed by a column-wise softmax function on the awareness matrix to produce a third awareness matrix, wherein the query-aware context encodings G are based upon the first awareness matrix, the second awareness matrix, and the third awareness matrix.

Various embodiments are described, wherein determining the starting word and the ending word of the answer in the document further includes: applying a first BiRNN on the matrix M; applying a first linear layer followed by a first softmax function on the output of the first BiRNN; selecting the maximum value of the output of the first softmax function as the staring word; applying a second BiRNN on the output of the first softmax function and the matrix M; applying a second linear layer followed by a second softmax function on the output of the second BiRNN; and selecting the maximum value of the output of the second softmax function as the ending word.

Further various embodiments relate to a non-transitory machine-readable storage medium encoded with instructions for determining the answer to a query in a document, including instructions for: encoding, by an encoder, the query and the document; generating a query-aware context encodings G by a bidirectional attention system using the encoded query and the encoded document; performing a hierarchical self-attention on the query aware document by a hierarchical self-attention system by applying a word to word attention and a word to sentence attention mechanism resulting in a matrix M; and determining the starting word and the ending word of the answer in the document by a span detector based upon the matrix M.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Information expressed in natural language can be broad and diverse. The need for MC systems arise in order to facilitate the users to efficiently focus on the most relevant and interesting content in a potentially larger context. Specifically, a MC system is given a document containing a mass of information, and a query that represents the point of interest. The problem is to provide an answer by selecting a span of text in the document. Current deep learning-based MC systems perform close to a human level on relatively simpler datasets, while far from being robust on challenging ones. This is mostly because even though a system can roughly estimate a broad area of focus in the document, it essentially fails to select the exact span. In the embodiments described herein, a solution to this issue is described that includes a system to carefully read and reason through the interested focus area, thus delivering better answers to questions.

Figure 1:
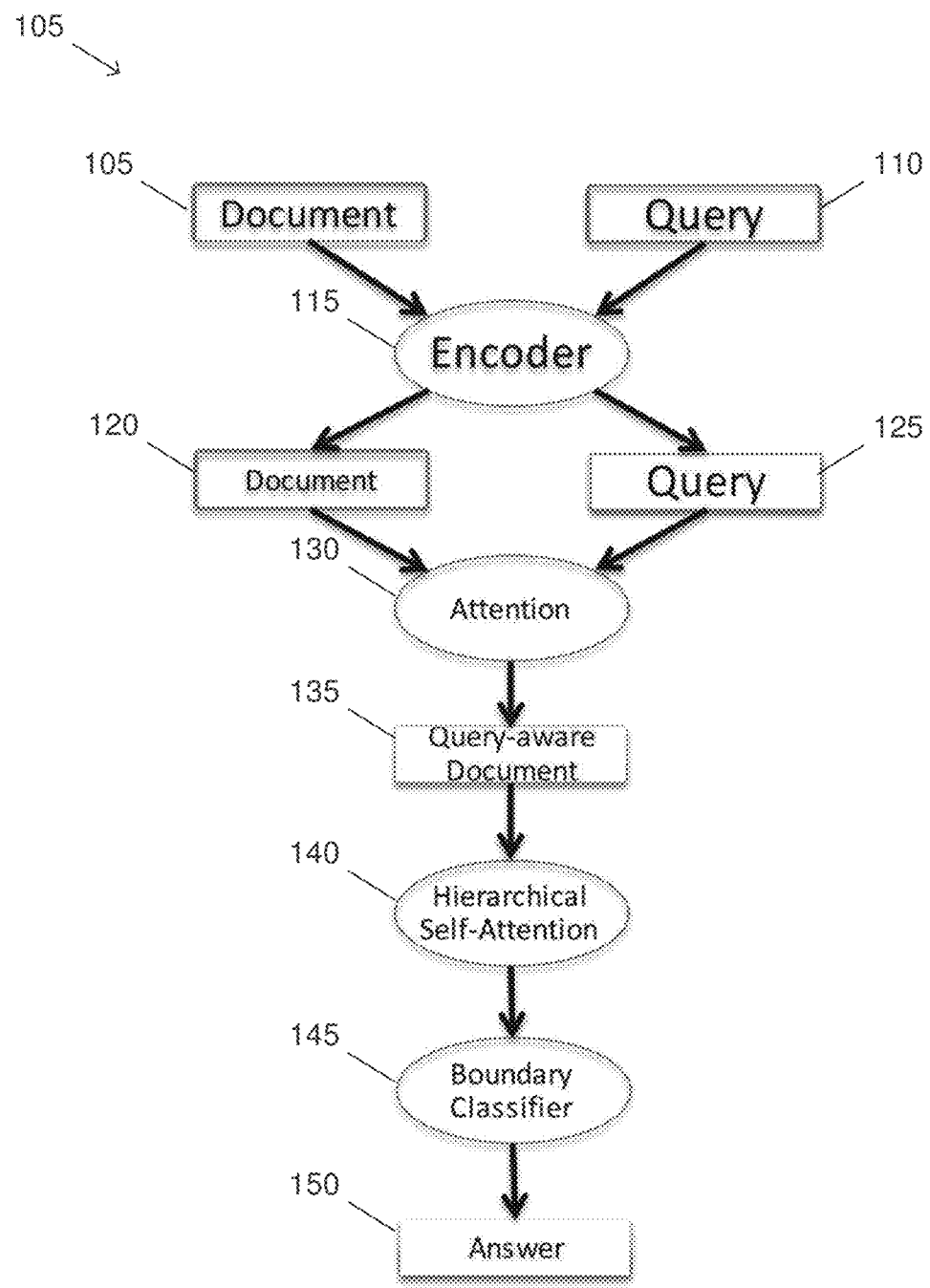
FIG. 1 illustrates a high level architecture of a MC system.

The embodiments described herein use a deep learning-based model for machine comprehension. FIG. 1 illustrates a high level architecture of a MC system. Given a multi-sentence document and a relatively short query, the system selects a piece of text from the document as the answer to the query. The MC system uses hierarchical self-attention to conduct fine reading on the focused scope of the document by aligning word to word and word to sentence. To illustrate, the MC system 100 reads the document 105 and the query 110. The MC system takes the input document and the query and converts them into vectors and these vectors are encoded by the encoder 115 to produce an encoded document 120 and encoded query 125. These encoded vectors may then be used to determine the specific span of text in the document that provides an answer to the query. Then, the MC system 100 uses an attention mechanism 130 to induce alignment between words in the document and the query, constructing a query-aware document representation 135. Next, a hierarchical self-attention mechanism 140 is used to read the query-aware document representations hierarchically and decompose the hierarchical structure into word-level context, where an individual word becomes aware of the global point of interest given the query. During this stage, extra sentence-level features from external resources may also be introduced into the framework. This hierarchical self-attention mechanism 140 further encodes the query-aware document by aligning word to word and word to sentences. Finally, at the answer prediction stage, the MC system 100 outputs the piece of text in the document by using a boundary classifier 145 to select the starting word and the end word of the answer. Additional feature layers and their fusions may be added during the encoding stage to explicitly include various important information from the question-level and document-level contexts such as named entities, sentence position, word position, part-of-speech tags, etc. The proposed MC system can be effectively used in other real-world applications such as summarization, search engines, chatbots, and so on.

Figure 2:
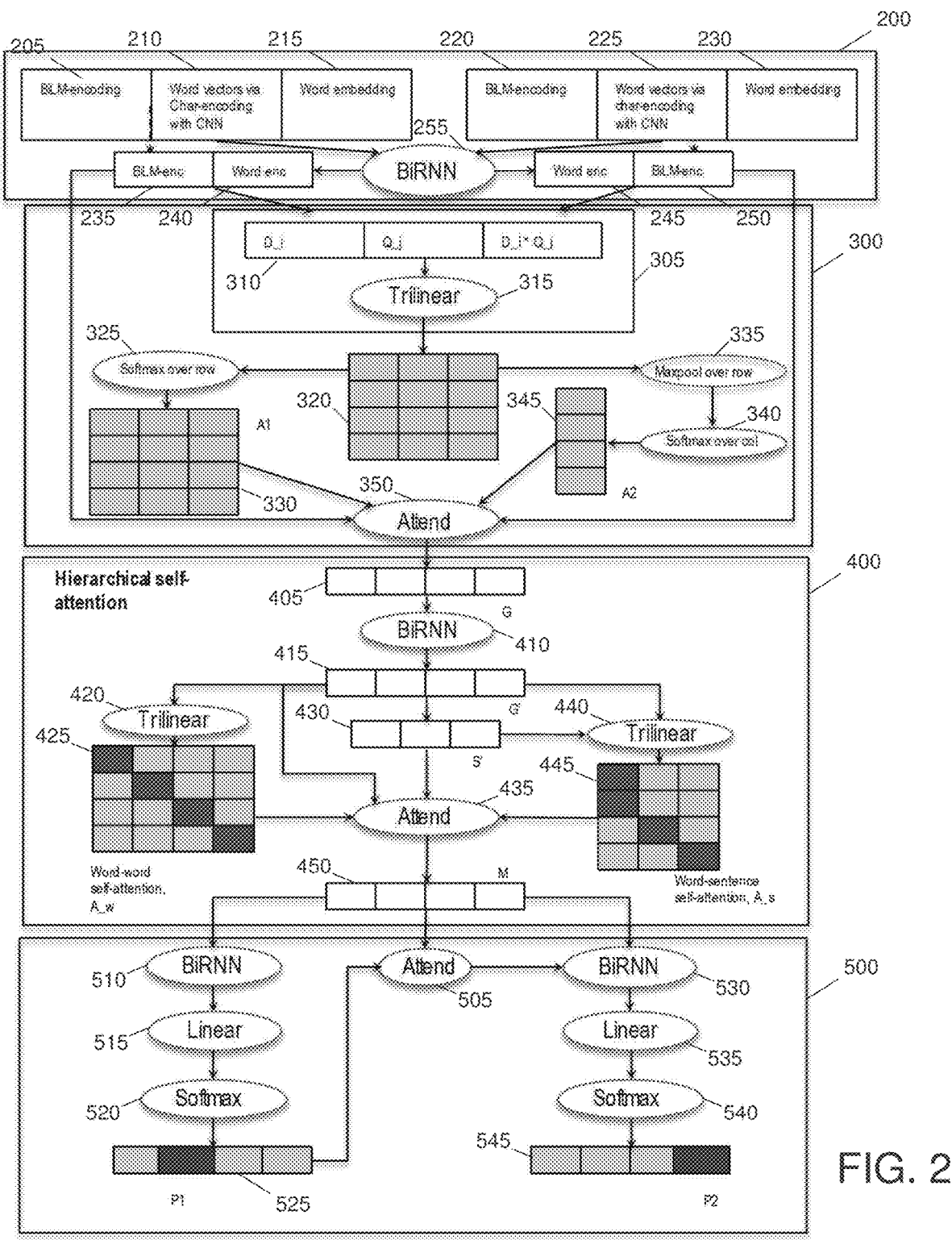
FIG. 2 illustrates a detailed architecture of the MC system.

FIG. 2 illustrates a detailed architecture of the MC system. The MC system 100 includes an encoder system 200, a bidirectional attention system 300, a hierarchical self-attention system 400, and a span detector 500. Each of these systems will now be described in more detail.

The encoder system 200 uses a traditional encoder. The encoder system 200 uses three types of encoding on both the document and the query: 1) context dependent encoding from bidirectional language model (BiLM) 205 and 220; 2) word vectors via character encodings from a standard convolution network 210 and 225; and 3) word embeddings e.g., GloVe/Word2Vec 215 and 230. While these three types of encoding are described, other types of encoding may be used instead.

Word embedding uses supervised/unsupervised context independent word vector library, e.g., GloVe/Word2Vec or others. For every word in the document D, there is a d-dimensional vector associated with it. Thus, the embedding variable below is of shape m×d, where m is the number of words in the document. Similarly, the query's (Q) embedding variable has shape n×d, where n is the number of words in query. Embeddings are used to capture context-free prior of the example.

The context dependent encoding may use BiLM embeddings (e.g., ELMo) generated by bidirectional language model tuned on large text corpora. This is context-dependent information. A Recurrent Neural Network (RNN) based bidirectional language model is used to scan over each sentence in both of the document and the query, yielding a v-dim vector for each word. The v-dim vector are a weighted sum of hidden states in the two-layer RNN and its corresponding input. The weights are jointly trained with the pipeline. The concatenation of all of these vectors becomes the context dependent encoding of the document 205 and the query 220. While BiLM is used in this example, other context dependent encoding schemes may be used as well.

Word vectors via character encoding with CNN produces word embeddings composed of character-level embeddings. Every character in a word is associated with a k-dim embeddings. Following traditional character CNN, the k-dim vectors in a word are then projected to dimension d using Convolution Neural Networks (CNN), and through max pooling layer, a single d-dim vector is generated for each word. The character embeddings and the CNN are jointly trained with in the architecture. The purpose of this character embedding is to generate better context-free word embeddings for words that are not in the previous word vector library. Further, other types of word encoding using character encoding may also be used. This word encoding is trained during the training phase of the MC system 100.

The result of concatenating BiLM encodings 205 and 220, character encodings 210 and 225, and word embedding 215 and 230 is a (v+k+d) dimensional vector for each word in the example. That is the document now vectorized into a m×(v+k+d) matrix or the encoded document D 260, and the query into a n×(v+k+d) matrix or the encoded query Q 265.

Next, a bidirectional recurrent neural network (BiRNN) is applied to the encoded document D and the encoded query Q. The BiRNN may be a bidirectional long short-term memory (BiLSTM), bidirectional gated recurrent units (BiGRU), or some other type of BiRNN. The same BiRNN is applied to both the encoded document D and the encoded query Q to encode word-level information. The input is a sequence of word vectors (in the present case, each vector of size v+k+d). The output is a h-dimensional encoding vector for each word. The purpose of this encoder is to generate context-dependent encodings (i.e., the encoding variables) over context-independent/dependent embeddings. The output encoding will be specialized for the future steps in the pipeline. The outputs 240 and 245 of the BiRNN 255 are then concatenated with the BiLM encodings 205 and 220 to produce the final encoded document 235 (D) and the final encoded query 250 (Q). These values D and Q as well as D*Q are then used by the bidirectional attention system 300.

The bidirectional attention system 300 uses a traditional bidirectional attention method. The purpose of the bidirectional attention system 300 is to generate query-aware encodings for the document. This is done by aligning words in the query with the document and then combining the query with the document into a query aware document.

The input is, again, the output of BiRNN encoder 255 concatenated with BiLM encodings 205 and 220. That is, every document/query word has an encoding vector, denoted as $D\_i$ and $Q\_j$ along with $D\_i*Q\_j$.

Each document word $D\_i$ and each query word $Q\_j$ and $D\_i*Q\_j$ are passed into a similarity function, calculated in a trilinear fashion and passing the outcome vector to a linear vector to obtain a scaler value for each similarity score, denoted in the similarity matrix 320 which shows the similarity between all document words and all query words. The similarity matrix 320 is then further condensed by normalizing the similarity matrix 320 row-wise using a softmax function 325 over each row to produce an attention matrix A1 330.

The similarity matrix 320 also has a maxpool functions applied row-wise and this is then normalized column-wise using a softmax function 340 over the columns to produce a column attention matrix A2 345 that indicates bidirectional attentions. Based on these two attention matrices 330 and 345, encodings from the document and the query are attended by the attend layer 350. The Attend layer is defined as: G=[D, A.Q, D*(A.Q), D*(A2.D)], where [,] means concatenation, [*] means element-wise multiplication, [.] means matrix multiplication. (A2.D) results in a vector, which is expanded to match the dimensionality of D. The result of this phase is query-aware context encodings G 405.

The basic idea of hierarchical self-attention system 400 for machine comprehension task and potential extensions is now illustrated. The hierarchical self-attention system receives the query-aware context encoding G and further encodes the query aware document by aligning each of the words and sentences in terms of the word. One level of attention is for example to compare a first word with other words nearby to see how they are related to one another. The next level of attention is how is the current word related to the current sentence. The result is an indication of how each word is related to other words and sentences. This results in a better representation of the content that helps to find the span of the answer.

The input is G is then fed into a BiRNN encoder 410 to merge concatenated features, and the output is denoted as G' 415 to provide a representation of the whole document. Then sentence-level encodings are extracted from G' (not shown). That is one vector for each sentence. The sentence level encodings may be either extracted as the last hidden states for every sentence, or maxpooled over the word encodings for each sentence, and other methods may be used as well to extract the sentence level encodings. The sentence encodings may be denoted as S. Optionally, extra sentence-level information may be brought in from additional pretrained resources e.g., InferSent or Universal Sentence Encoder. The sentence features extracted as described above with the sentence features from pretrained resources as described above may be merged with the sentence encodings S. The definition of the merge function may include concatenation followed by optional linear layers. The output is denoted as S' 430 in the diagram, where each sentence has a vector.

Each word $G'\_i$ interacts with other word $G'\_j$ (except itself) via a trilinear function 420 to calculate the similarity score (like the trilinear layer above), resulting in a similarity matrix. The similarity matrix is then normalized row-wise using a softmax function (same as above). For simplicity of the diagram, the normalization unit is omitted here. Optionally, a maxpool operation may also be performed on the matrix. The result is an attention matrix A_w 425. This results in word to word self-attentions.

Now word to sentence comparisons are now preformed. Each word $G'\_i$ interacts with each sentence $S'\_j$ (except the sentence that $G'\_i$ resides in) by another trilinear layer 440. The result is then normalized row-wise using a softmax function, yielding attention matrix A_s 445. Optionally, a maxpool operation may also be performed on the matrix. This results in a word to sentence attention. Next, an attend layer 435 (similar to above) is used to concatenate features as follows: M=[G', A_w.G', G'*(A_w.G'), A_s.S', G'*(A_s.S')]. This result is significantly different from traditional hierarchical self-attention, where word aligns to word and sentence aligns to sentence. Here in the MC system, eventually the system needs to select the starting/ending words, so the features need to be operated on at word level. Thus, the hierarchical self-attention in a decomposing fashion by using word-to-sentence alignment is proposed.

The benefits of the hierarchical self-attention are: introducing a hierarchical view at word level; and introducing extra features from external pretrained resources.

The span detector is a traditional classifier that predicts the position of the starting word and then, based on that, predict the position of the ending word. Starting with M and G (omitted here for ease of illustration), the model uses a BiRNN layer 510 followed by a linear layer 515 and softmax 520 to predict probability of the start word of answer span (i.e., P1).

Then the span detector 400 uses P1 with M and G to attend, which result is then is fed into a BiRNN 530 followed by a linear layer 535 and a softmax function 540 to produce a probability of the end word of answer span (i.e., P2).

The MC system 100 may be trained using traditional methods. For example, a cross entropy loss function may be used, and then a set of training data used to train the model using gradient decent to determine the final model parameters. Other traditional loss functions may be used as well as well as other training methods.

The embodiments of a machine comprehension system described herein solve the technological problem of determining a precise answer to query where the answer is found a in document. A hierarchical self-attention system/layer is used to align words to words and words to sentences in order to better select a beginning word and end word of the answer in the document. This system improves the ability of a machine comprehension system to more accurately and precisely find the answer to a query in a document.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for determining the answer to a query in a document, comprising:
encoding, by an encoder, the query and the document;
generating a query-aware context encodings G by a bidirectional attention system using the encoded query and the encoded document;
performing a hierarchical self-attention on the query aware document by a hierarchical self-attention system by applying a word to word attention and a word to sentence attention mechanism resulting in a matrix M by:
applying a bidirectional recurrent neural network (BiRNN) on the query-aware context encoding G to produce a matrix G';
extracting sentence-level encodings S' from G';
producing a word-word self-attention matrix A_w by comparing each word in G' with each other word in G'
producing a word-sentence self-attention matrix A_S by comparing each word in G' to each sentence in the extracted sentence-level encodings S', wherein the matrix M is based upon A_w and A_s; and
determining the starting word and the ending word of the answer in the document by a span detector based upon the matrix M.

2. The method of claim 1, wherein producing a word-word self-attention matrix A_w further includes using a trilinear function to compute similarity scores for each word-word comparison and normalizing the resulting matrix row-wise using a softmax function.

3. The method of claim 2, wherein producing a word-word self-attention matrix A_w further includes performing a row-wise maxpool function on the resulting matrix.

4. The method of claim 1, wherein producing a word-sentence self-attention matrix A_s further includes using a trilinear function to compute similarity scores for word-sentence attention and normalizing the resulting matrix row-wise using a softmax function.

5. The method of claim 4, wherein producing a word-word self-attention matrix A_s further includes performing a row-wise maxpool function on the resulting matrix.

6. The method of claim 1, wherein performing a hierarchical self-attention on the query aware document further includes merging sentence features from a pretrained source with the extracted sentence-level encodings S'.

7. The method of claim 1, wherein the query and the document further comprises:
encoding the query and the document with a context dependent encoding;
encoding the query and the document into word vectors via character encoding from a convolution network;
encoding the query and the document into a word embedding using a context independent word vector library; and
applying a BiRNN on the context dependent encoded query and document, the word vectors for the query and document, and the word embeddings for the query and document.

8. The method of claim 7, wherein the output of the BiRNN for the query is combined with the context dependent encoded query and the output of the BiRNN for the document is combined with the context dependent encoded document.

9. The method of claim 1, wherein generating a query-aware context encodings further includes:
applying a trilinear function on encoded query and the encoded document to produce a first awareness matrix;
applying a row-wise softmax function on the awareness matrix to produce a second awareness matrix; and
applying a row-wise maxpool function followed by a column-wise softmax function on the awareness matrix to produce a third awareness matrix,
wherein the query-aware context encodings G are based upon the first awareness matrix, the second awareness matrix, and the third awareness matrix.

10. The method of claim 1, wherein determining the starting word and the ending word of the answer in the document further includes:
applying a first BiRNN on the matrix M;
applying a first linear layer followed by a first softmax function on the output of the first BiRNN;
selecting the maximum value of the output of the first softmax function as the staring word;
applying a second BiRNN on the output of the first softmax function and the matrix M;
applying a second linear layer followed by a second softmax function on the output of the second BiRNN; and
selecting the maximum value of the output of the second softmax function as the ending word.

11. A non-transitory machine-readable storage medium encoded with instructions for determining the answer to a query in a document, comprising instructions for:
encoding, by an encoder, the query and the document;
generating a query-aware context encodings G by a bidirectional attention system using the encoded query and the encoded document;
performing a hierarchical self-attention on the query aware document by a hierarchical self-attention system by applying a word to word attention and a word to sentence attention mechanism resulting in a matrix M by:
applying a bidirectional recurrent neural network (BiRNN) on the query-aware context encoding G to produce a matrix G';
extracting sentence-level encodings S' from G';
producing a word-word self-attention matrix A_w by comparing each word in G' with each other word in G'; and
producing a word-sentence self-attention matrix A_s by comparing each word in G' to each sentence in the extracted sentence-level encodings S',
wherein the matrix M is based upon A_w and A_s; and
determining the starting word and the ending word of the answer in the document by a span detector based upon the matrix M.

12. The non-transitory machine-readable storage medium of claim 11, wherein producing a word-word self-attention matrix A_w further includes using a trilinear function to compute similarity scores for each word-word comparison and normalizing the resulting matrix row-wise using a softmax function.

13. The non-transitory machine-readable storage medium of claim 12, wherein producing a word-word self-attention matrix A_w further includes performing a row-wise maxpool function on the resulting matrix.

14. The non-transitory machine-readable storage medium of claim 12, wherein producing a word-sentence self-attention matrix A_s further includes using a trilinear function to compute similarity scores for word-sentence attention and normalizing the resulting matrix row-wise using a softmax function.

15. The non-transitory machine-readable storage medium of claim 14, wherein producing a word-word self-attention matrix A_s further includes performing a row-wise maxpool function on the resulting matrix.

16. The non-transitory machine-readable storage medium of claim 11, wherein performing a hierarchical self-attention on the query aware document further includes merging sentence features from a pretrained source with the extracted sentence-level encodings S'.

17. The non-transitory machine-readable storage medium of claim 11, wherein the query and the document further comprises instructions for:
encoding the query and the document with a context dependent encoding;
encoding the query and the document into word vectors via character encoding from a convolution network;
encoding the query and the document into a word embedding using a context independent word vector library; and
applying a BiRNN on the context dependent encoded query and document, the word vectors for the query and document, and the word embeddings for the query and document.

18. The non-transitory machine-readable storage medium of claim 17, wherein the output of the BiRNN for the query is combined with the context dependent encoded query and the output of the BiRNN for the document is combined with the context dependent encoded document.

19. The non-transitory machine-readable storage medium of claim 11, wherein generating a query-aware context encodings further includes instructions for:
applying a trilinear function on encoded query and the encoded document to produce a first awareness matrix;
applying a row-wise softmax function on the awareness matrix to produce a second awareness matrix; and
applying a row-wise maxpool function followed by a column-wise softmax function on the awareness matrix to produce a third awareness matrix,
wherein the query-aware context encodings G are based upon the first awareness matrix, the second awareness matrix, and the third awareness matrix.

20. The non-transitory machine-readable storage medium of claim 11, wherein determining the starting word and the ending word of the answer in the document further includes instructions for:
applying a first BiRNN on the matrix M;
applying a first linear layer followed by a first softmax function on the output of the first BiRNN;
selecting the maximum value of the output of the first softmax function as the staring word;
applying a second BiRNN on the output of the first softmax function and the matrix M;
applying a second linear layer followed by a second softmax function on the output of the second BiRNN; and
selecting the maximum value of the output of the second softmax function as the ending word.

* * * * *